United States Patent
Yalozo et al.

(10) Patent No.: US 10,554,776 B2
(45) Date of Patent: Feb. 4, 2020

(54) STARTUP OF MESSAGE-PASSING-INTERFACE (MPI) BASED APPLICATIONS IN A HETEROGENEOUS ENVIRONMENT

(71) Applicant: Intel Corporation, Santa Clara, CA (US)

(72) Inventors: Artem V. Yalozo, Sarov (RU); Alexander Supalov, Tuntenhausen (DE); Michael Chuvelev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 14/643,066

(22) Filed: Mar. 10, 2015

(65) Prior Publication Data
US 2015/0288777 A1 Oct. 8, 2015

(30) Foreign Application Priority Data
Apr. 8, 2014 (RU) .................. 2014113754

(51) Int. Cl.
*H04L 29/08* (2006.01)
(52) U.S. Cl.
CPC .................... *H04L 67/28* (2013.01)
(58) Field of Classification Search
CPC ............... H04L 67/28; H04L 67/025
USPC ......................................... 709/202
See application file for complete search history.

(56) References Cited

U.S. PATENT DOCUMENTS

| | | | |
|---|---|---|---|
| 7,512,934 B2 * | 3/2009 | Gatlin ................... | G06F 11/321 717/124 |
| 7,644,130 B2 | 1/2010 | Magro et al. | |
| 8,397,224 B2 * | 3/2013 | Moler ...................... | G06F 8/45 717/119 |
| 8,561,077 B1 * | 10/2013 | Ellis ........................ | G06F 9/526 718/104 |
| 8,589,953 B1 * | 11/2013 | Havemose .......... | G06F 11/2041 707/610 |

(Continued)

OTHER PUBLICATIONS

Artem Yalozo, "Intel® MPI Library 4.1 Hydra by default for Windows* OS", Intel Corporation, Feb. 2013.*

(Continued)

*Primary Examiner* — Nicholas R Taylor
*Assistant Examiner* — Chong G Kim
(74) *Attorney, Agent, or Firm* — Grossman, Tucker, Perreault & Pfleger, PLLC

(57) ABSTRACT

Generally, this disclosure provides systems, devices, methods and computer readable media for launching MPI-based processes and applications on multiple platform types. A method may include determining a type of an OS associated with a processing node platform on which the MPI-based process is to be launched. The method may also include launching a proxy module on the processing node platform, the proxy module configured to launch the MPI-based process. The launching of the proxy module may include operations that are based on the determination of the OS type of the processing node platform. These operations may include the execution of a secure shell for remote process launching and/or requesting a remote process launching from a system service module executing on the processing node platform.

13 Claims, 7 Drawing Sheets

(56) References Cited

U.S. PATENT DOCUMENTS

| | | | | |
|---|---|---|---|---|
| 8,738,684 B1* | 5/2014 | Ellis | G06F 9/4843 | 709/201 |
| 9,451,012 B1* | 9/2016 | Neill | H04L 67/1012 | |
| 9,467,494 B1* | 10/2016 | Mahalingaiah | H04L 67/02 | |
| 9,503,514 B2* | 11/2016 | Archer | H04L 67/38 | |
| 9,703,515 B1* | 7/2017 | Muellers | G06F 11/302 | |
| 2003/0120704 A1* | 6/2003 | Tran | G06F 9/4843 | 718/104 |
| 2004/0098447 A1* | 5/2004 | Verbeke | G06F 9/5055 | 709/201 |
| 2004/0153834 A1* | 8/2004 | Oshima | G06F 11/0751 | 714/38.11 |
| 2004/0205377 A1* | 10/2004 | Nakamura | G06F 11/1494 | 714/4.5 |
| 2005/0144474 A1 | 6/2005 | Talaka et al. | | |
| 2005/0234846 A1* | 10/2005 | Davidson | G06F 9/4416 | |
| 2006/0041644 A1 | 2/2006 | Henseler | | |
| 2006/0059473 A1* | 3/2006 | Moler | G06F 8/45 | 717/149 |
| 2007/0156874 A1* | 7/2007 | Magro | H04L 29/12952 | 709/223 |
| 2007/0260733 A1* | 11/2007 | Havemose | G06F 11/1482 | 709/226 |
| 2008/0103728 A1* | 5/2008 | Archer | G06F 11/3409 | 702/182 |
| 2008/0148300 A1* | 6/2008 | Archer | G06F 9/5077 | 719/330 |
| 2008/0148355 A1* | 6/2008 | Archer | G06F 21/6218 | 726/3 |
| 2009/0007256 A1 | 1/2009 | Raymond et al. | | |
| 2009/0055836 A1* | 2/2009 | Supalov | G06F 9/541 | 719/313 |
| 2009/0063880 A1* | 3/2009 | Arimilli | G06F 9/5088 | 713/320 |
| 2010/0017655 A1* | 1/2010 | Gooding | G06F 11/1482 | 714/16 |
| 2010/0293541 A1* | 11/2010 | Pall | G06F 8/61 | 717/178 |
| 2010/0325278 A1* | 12/2010 | Heim | G06F 9/4416 | 709/226 |
| 2011/0055487 A1* | 3/2011 | Sapronov | G06F 9/546 | 711/130 |
| 2011/0238792 A1* | 9/2011 | Phillips | G06F 15/177 | 709/220 |
| 2011/0296241 A1* | 12/2011 | Elnozahy | G06F 11/1438 | 714/19 |
| 2012/0210324 A1* | 8/2012 | Truschin | G06F 9/546 | 718/102 |
| 2012/0271977 A1* | 10/2012 | Ellis | G06F 9/4806 | 710/260 |
| 2013/0103905 A1* | 4/2013 | Sapronov | G06F 12/084 | 711/130 |
| 2014/0189701 A1 | 7/2014 | Semin et al. | | |
| 2015/0095912 A1 | 4/2015 | Semin et al. | | |
| 2015/0113033 A1* | 4/2015 | Bansal | H04L 67/10 | 709/201 |
| 2015/0121061 A1* | 4/2015 | Goyal | G06F 9/455 | 713/152 |
| 2015/0149814 A1* | 5/2015 | Ren | G06F 11/2028 | 714/4.11 |

OTHER PUBLICATIONS

Yucheng Guo, Dongxu Hu, Peng Wu. MPI-based Heterogeneous Cluster Construction Technology, DCABES 2012, Guilin, 2012: 120-124.*

J. Krishna, P. Balaji, E. Lusk, R. Thakur, and F. Tillier, "Implementing MPI on Windows: comparison with common approaches on Unix," in Proceedings of the 17th European MPI users' group meeting conference on Recent advances in the message passing interface, ser. EuroMPI'10. Berlin, Heidelberg: Springer-Verlag, 2010, pp. 160-169.*

Russian Office Action from related application 2014113754 dated Oct. 7, 2015.

Yalozo, Artem, Intel MPI Library 4.1., "Hydra by default for Windows* OS," Feb. 18, 2013, 25 pages.

Yalozo, Artem, "Hetero OS Cluster with Intel MPI Library," Aug. 25, 2013, 15 pages.

* cited by examiner

400

STARTUP OF MESSAGE-PASSING-INTERFACE (MPI) BASED APPLICATIONS IN A HETEROGENEOUS ENVIRONMENT

FIELD

The present disclosure relates to Message-Passing-Interface (MPI) based applications, and more particularly, to systems and methods for the startup of MPI based applications in a heterogeneous environment.

BACKGROUND

Parallel processing computer systems may be employed to distribute a workload over multiple processors or computing nodes to increase computational throughput. Processes or tasks may execute in parallel on each of the nodes and may communicate with each other to share data, resources, results, etc. This communication, between nodes, may occur over a network or other communication link and may conform to a Message-Passing-Interface standard commonly referred to as MPI. A client-server approach is typically used in MPI, where a "server" process on one node indicates an ability to accept communications from "client" processes on other nodes. Communication links may subsequently be negotiated, established and synchronized between each client-server pairing through additional operations that can increase system complexity.

The parallel processing system may also, in general, be implemented in a heterogeneous environment where the computing nodes are hosted on different platforms that may include different processor architectures and/or different operating systems (OSs). The heterogeneous environment, however, may further increase the complexity of MPI operations. For example, different OSs may have different procedures for process launching (e.g., startup and initialization) on each node. Separate versions of MPI source code may need to be developed and maintained for each platform OS associated with one or more nodes in the heterogeneous environment, resulting in increased effort, cost and potential delays for the system implementation and updates.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for launching processes and/or applications that use the Message-Passing-Interface (MPI) standard (e.g., MPI-based processes) in a heterogeneous environment of platforms or nodes that may host different operating systems (OSs). A first node, which may be referred to as a launching node, may be configured to launch the MPI-based processes on that same node or on any number of other nodes, which may be referred to as processing nodes. The launching node may host a first type of OS while the processing nodes may host the same type or a different type of OS.

The launching node may include a cross platform process manager (PM) module configured to determine the type of OS on the processing node. The PM may also include a launch request module configured to send a launch request to the processing node. The processing node may be configured to create a proxy module, in response to that request, where the proxy module may launch one or more of the MPI-based processes. In some embodiments, depending on the type of the processing node OS, the proxy node may be created through the execution of a secure shell (SSH) or through a system service module of the processing node OS.

The cross platform PM, with the capability to execute under different OSs and to launch MPI-based processes on other nodes hosting different OSs, provides a unified PM infrastructure that mitigates the difficulties and complexities presented when different PMs, with different functionalities and features, are needed for different OSs.

Figure 1:
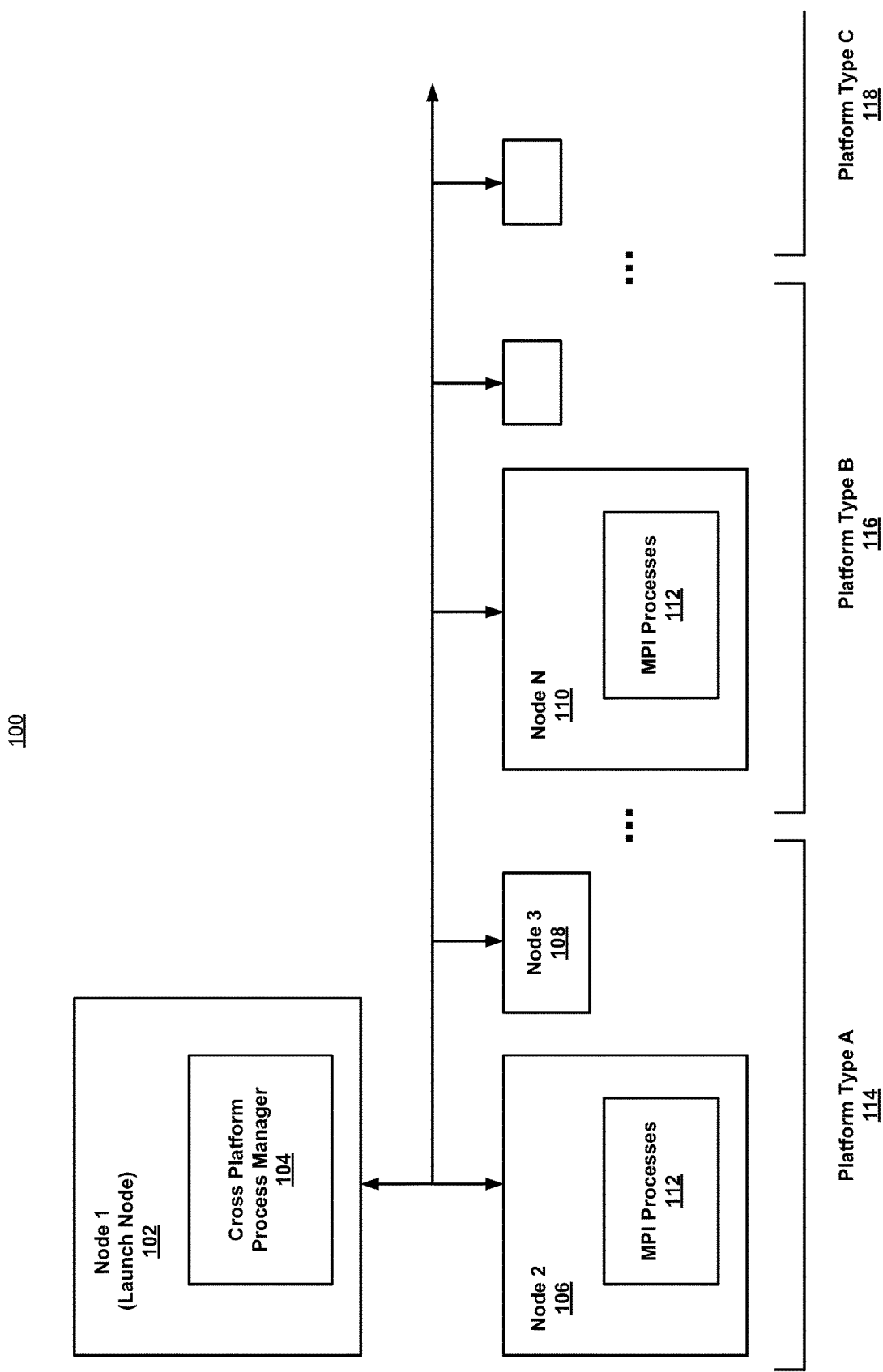
FIG. 1 illustrates a top level system diagram of one example embodiment consistent with the present disclosure.

FIG. 1 illustrates a top level system diagram 100 of one example embodiment consistent with the present disclosure. The system is shown to include a launch node 102 that further includes a cross platform process manager (PM) 104, the operations of which will be discussed in greater detail below. The system may also include any number of additional nodes 106, 108, 110, etc., referred to as processing nodes on which MPI-based processes 112 may be launched, for example in response to requests from the launch node. The MPI-based processes generally communicate to each other using a library of communication interface routines that conform to the MPI standard. The multiple nodes, both launch node 102 and processing nodes 106, 108, 110, may be hosted on the same or on different platform types, shown as platform type A 114, platform type B 116, platform type C 118, etc. The platform types may include different processor architectures and may host different OSs to form a heterogeneous computing environment. The processing nodes (and launch node) may be organized as a parallel processing cluster of nodes over which a task may distributed. The MPI-based inter-node communication may be employed for the sharing of data, resources and results to facilitate completion of the task in a parallel manner.

A node may be a computer, such as a workstation, laptop or server, but example embodiments are not limited thereto and may vary. An OS is a collection of software that may manage computer hardware resources and may provide common services for programs, processes and/or applications running under the OS. Linux® and Microsoft® Windows® are examples of operating systems, but example embodiments may vary and are not limited thereto. For example, embodiments may encompass any operating system, such as MacOS®, Android®, Berkeley Software Distribution (BSD®), iOS®, OS X®, QNX®, Windows® Phone, and IBM® z/OS®, etc.

Although one launch node and multiple processing nodes are shown in this figure for illustrative purposes, it will be appreciated that a system may be configured with any number or combination of launch and processing nodes and that the launch node may be implemented as one of the processing nodes. The heterogeneous environment may therefore include any number of platforms and OSs of different types.

Figure 2:
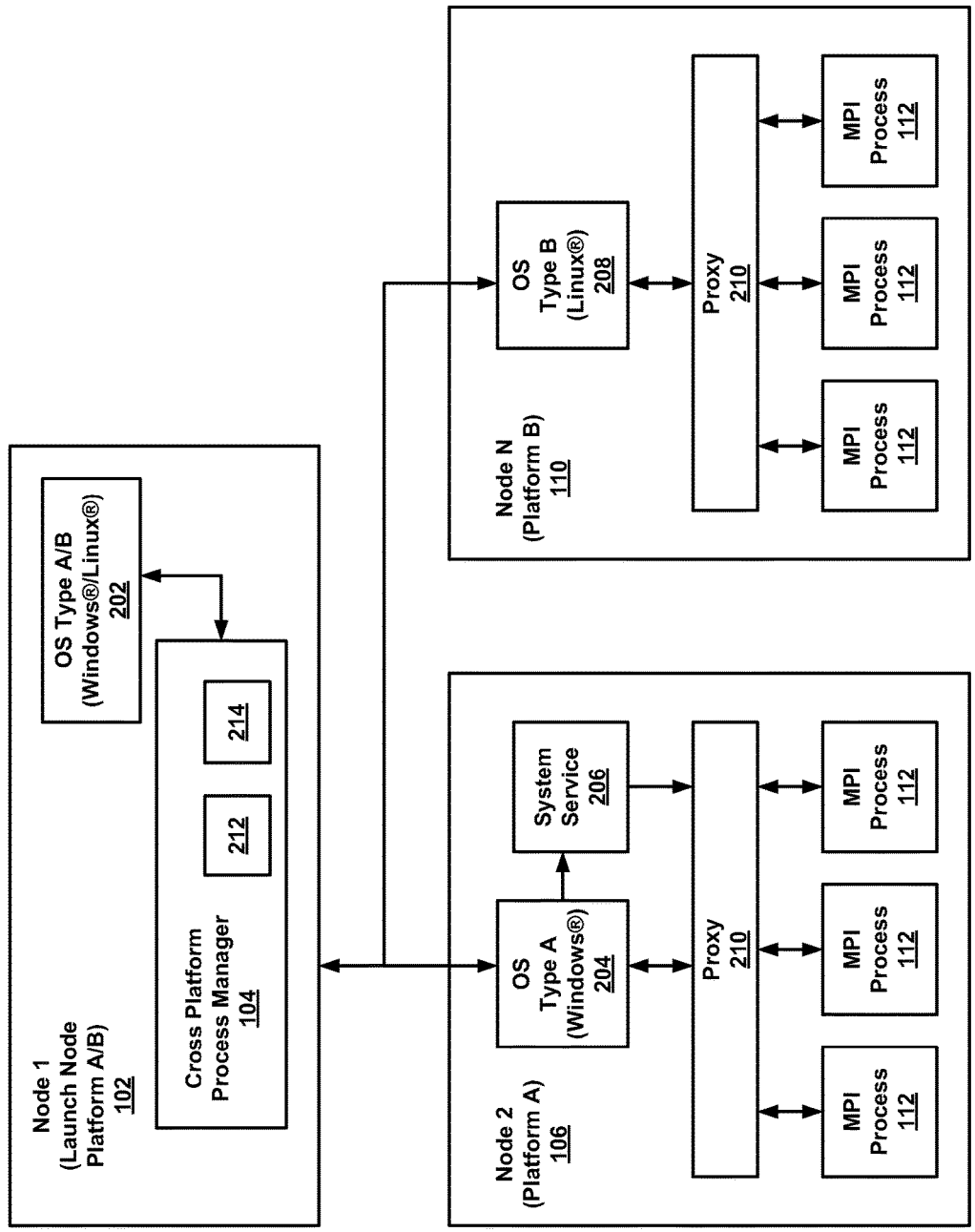
FIG. 2 illustrates a block diagram of one example embodiment consistent with the present disclosure.

FIG. 2 illustrates a block diagram 200 of one example embodiment consistent with the present disclosure. The system is shown in greater detail where an embodiment of the launch node 102 is implemented on a platform referenced as a type A or B platform which is configured to host an OS 202 that is similarly referenced as a type A or type B OS. In this example embodiment, for illustrative purposes, OS type A may be a Windows® OS and OS type B may be a Linux® OS or MacOS®. Cross platform PM 104, of launch node 102, may also include an OS type determination module 212 and a launch request module 214, the operations of which will be explained in greater detail below.

Also shown is processing node 106 (node 2) on a platform type A, configured to host an OS type A 204, a proxy module 210 and one or more launched MPI-based process 112. The OS 204 may also include a system service module 206. Another processing node 110 (node N), on a platform type B, is also shown. Node N may be configured to host an OS type B 208, a proxy module 210 and one or more launched MPI-based process 112.

The OS type determination module 212 of cross platform PM 104 may be configured to determine the OS type of the processing node upon which an MPI-based process is to be launched. Based on this determination, the launch request module 214 may be configured to send a request to that processing node to cause the processing node to create a proxy module 210. The OSs on the launch and processing nodes may be configured, at least in part, to provide TCP sockets for communication of launch requests.

In the case of processing node 106, hosting the Windows® OS, the proxy module may be created by the system service module 206 in response to the request from the launch node. The system service module may be a component of the Windows® OS, for example a pre-installed component. In the case of processing node 110, hosting the Linux® OS, the proxy module may be created through the execution of a secure shell (SSH) which is a cryptographic network protocol for secure data communication, remote command-line login, remote command execution, and other secure network services between two networked computers. Other examples of remote launchers analogous to SSH, which may be employed in some embodiments, include remote shell (RSH), remote fork, "srun" in Simple Linux Utility for Resource Management (SLURM), "blaunch" in Platform Load Sharing Facility (LSF), "qrsh" by Sun Grid Engine (SGE), "poe" to invoke the Parallel Operating Environment, and the like.

The created proxy module 210 may be configured to launch the MPI-based processes 112 which may then communicate to each other using MPI standard compliant interfaces or any suitable variation thereof.

In some embodiments, the system may be scalable and may allow hierarchical launches. For example, the proxy module of one processing node may communicate to the system service module of another processing node to request the creation of a proxy module on that second processing node, which may in turn launch MPI-based processes on that second node. Alternatively, the proxy module of one processing node may create another proxy module on another processing node, for example through execution of a SSH, which may in turn launch MPI-based processes on that second node.

In some embodiments, the MPI-based processes 112 may be launched on remote nodes (processing nodes) without the requirement for user input such as a password. Some operating systems may implement remote launching without requiring a password automatically, for example by launching a process remotely using secure shell (SSH). Other operating systems, however, may use an intermediate system service 206 which may already be executing on the remote node under administrative privileges to create processes on the remote node, the created processes then having the current user privileges (e.g., of the process on the launch node requesting the launch) so that MPI-based processes 112 may be launched remotely without entering a user account name and/or password. The system service may be included in the OS 204 to provide definitions and translations associated with that OS and to grant an appropriate level of privilege to the launched processes so that they may operate and communicate using MPI, for example over network connections.

Network communication may include, for example, InfiniBand® network communication and/or other relatively high performance communication networks. Other network communication types may include communications between devices using a close range communications network such as a BLUETOOTH® network, a personal area network (PAN), near field communication (NFC), a ZigBee network, a wired Ethernet connection, a wired or wireless universal serial bus (USB) connection, radio frequency identification (RFID), and a long range communications network such as a Wi-Fi network, a wide area network (WAN) including but not limited to a cell phone network (3G, 4G, etc. and the like), the internet, an enterprise network, telephony networks, or any combinations thereof, and the like.

In some embodiments, the system service 206 may open a TCP socket in listen mode, for example during or after startup of the processing node 106, to monitor for launch requests from the launch node 102. In some embodiments, the listen socket may be opened on port 8679. The launch requests may include command line arguments, user credentials and/or any other information associated with the launching of proxy modules 210 and MPI-based communication processes 112. The system service 206 may break the connection with launch node (or cross platform PM 104) after the proxy module 210 is created/launched.

In some embodiments, the cross platform PM 104 may be configured as two (or more) source code modules which may be developed, compiled and maintained independently of each other. Although both modules may be compiled to translate the source code to binary executables that are compatible with the launch node platform hardware and OS, the first source code module may be configured to include source code that is independent of the launch node OS. In contrast, the second source code module may be configured to include source code that is dependent on or otherwise related to the launch node OS. It will be appreciated that this division of source code may simplify development, distribution and maintenance of the cross platform PM 104. In some embodiments, the second (OS dependent) source code may be relatively smaller and less complex than the first source code module.

Figure 3:
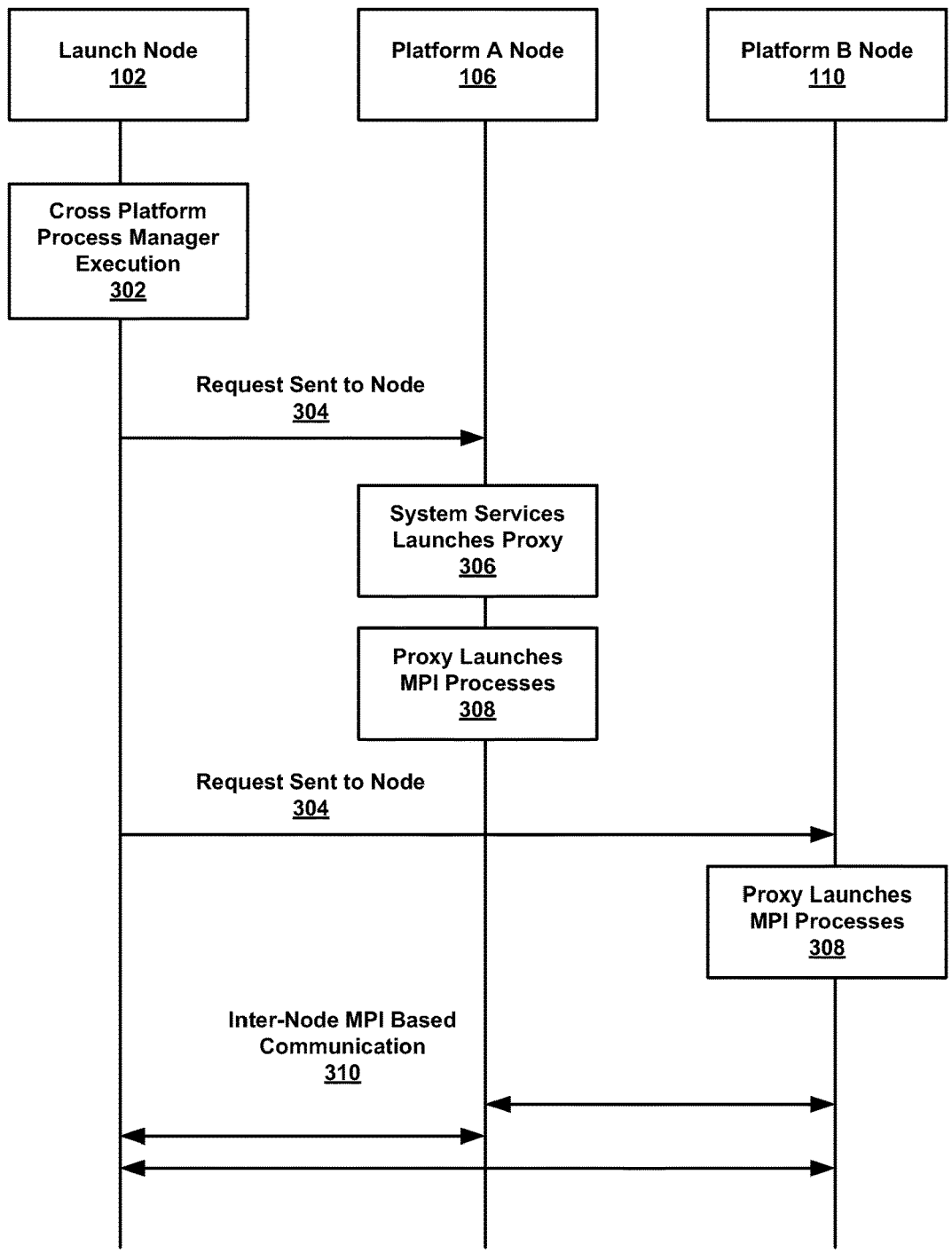
FIG. 3 illustrates a communication flow diagram of one example embodiment consistent with the present disclosure.

FIG. 3 illustrates a communication flow diagram 300 of one example embodiment consistent with the present disclosure. The launch node 102 executes a cross platform process manager 302. In some embodiments, the launch node 102 may be a Windows® OS platform or a Linux® OS platform. Requests to launch MPI-based processes 304 are sent from the launch node 102 to platform A node 106 and platform B node 110. The requests may be sent through TCP socket connections between the nodes. In response to these requests 304, a system service module on platform A node 106 launches a proxy module 306 which in turn launches one or more MPI-based processes 308. In some embodiments, the platform A node 106 may be a Windows® OS platform.

Also in response to these requests, a proxy module is created on platform B node 110 directly from the launch node (for example through a secure shell) and the proxy module launches one or more MPI-based processes 308. In some embodiments, the platform B node 110 may be a Linux® OS platform.

After the MPI-based processes are launched, they may communicate with each other 310, for example using library routines that implement the MPI standard or a variant thereof. The MPI communication 310 may occur between processes on the same node or between processes on any of the nodes 102, 106, 110 and may occur over network TCP sockets connections in a peer-to-peer manner.

Figure 4:
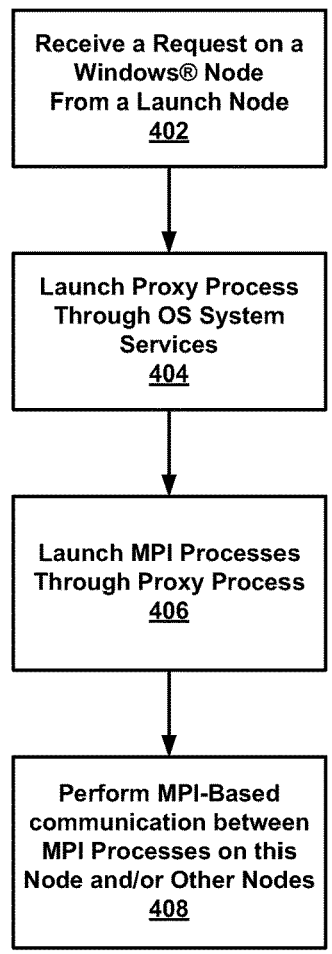
FIG. 4 illustrates a flowchart of operations of one example embodiment consistent with the present disclosure.

FIG. 4 illustrates a flowchart of operations 400 of one example embodiment consistent with the present disclosure. The operations provide a method for launching an MPI-based process on a processing node hosting a Windows® OS or variant thereof. At operation 402, a request to launch an MPI-based process is received from a launch node. At operation 404, a proxy process is launched on the processing node, in response to the request, by a system services component of the processing node OS. At operation 406, the proxy process launches the MPI-based process. At operation 408, MPI-based communication is performed between the launched MPI process on this node and other MPI-based processes on this or other nodes, including the launch node.

Figure 5:
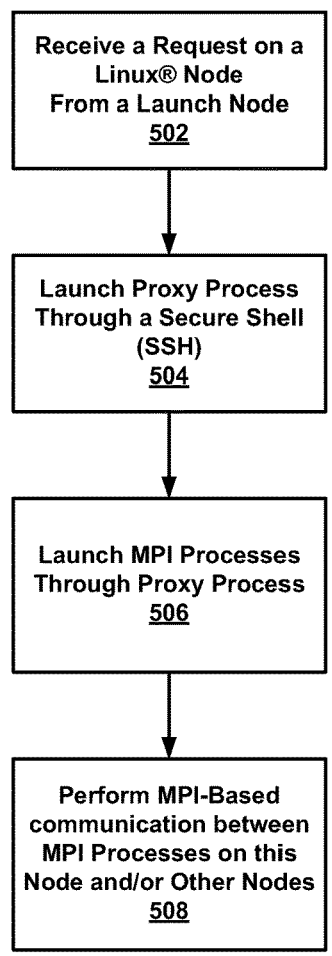
FIG. 5 illustrates a flowchart of operations of another example embodiment consistent with the present disclosure.

FIG. 5 illustrates a flowchart of operations 500 of another example embodiment consistent with the present disclosure. The operations provide a method for launching an MPI-based process on a processing node hosting a Linux® OS, a MacOS® or variant thereof. At operation 502, a request to launch an MPI-based process is received from a launch node. At operation 504, a proxy process is launched on the processing node, in response to the request, through the execution of a secure shell. At operation 506, the proxy process launches the MPI-based process. At operation 508, MPI-based communication is performed between the launched MPI process on this node and other MPI-based processes on this or other nodes, including the launch node.

Figure 6:
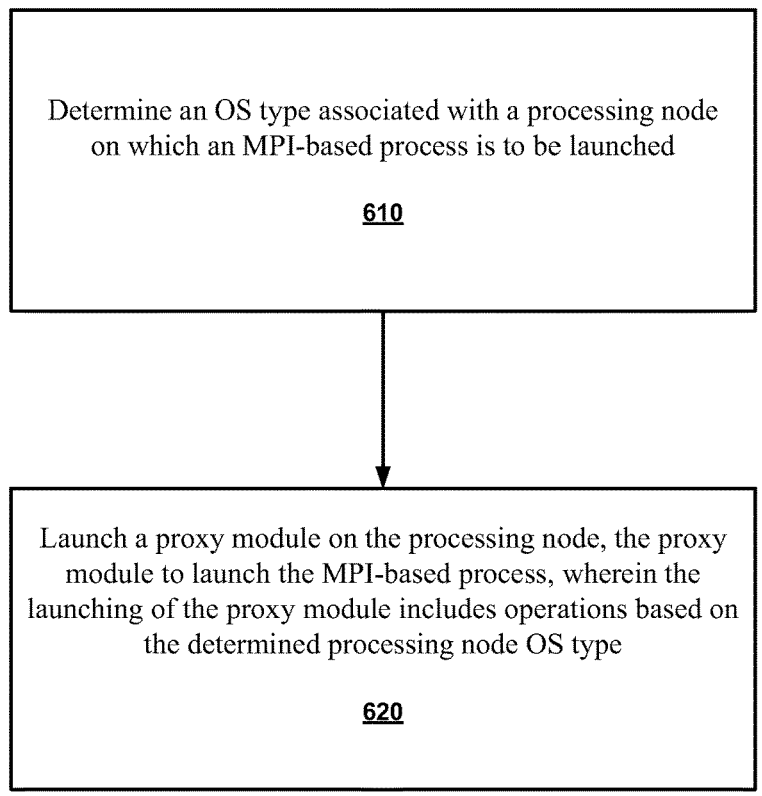
FIG. 6 illustrates a flowchart of operations of another example embodiment consistent with the present disclosure.

FIG. 6 illustrates a flowchart of operations 600 of another example embodiment consistent with the present disclosure. The operations provide a method for launching an MPI-based process from a launching node. At operation 610, a determination is made as to the type of an OS associated with a processing node on which the MPI-based process is to be launched. At operation 620, a proxy module is launched on the processing node. The proxy module is configured to launch the MPI-based process. The launching of the proxy module includes operations that are based on the determination of the OS type of the processing node. If the OS type of the processing node is a Linux® OS or MacOS®, the proxy module is launched through the execution of a secure shell for remote process launching. If the OS type of the processing node is a Windows® OS, the proxy module is launched by requesting a remote process launching from a system service module executing on the processing node.

Figure 7:
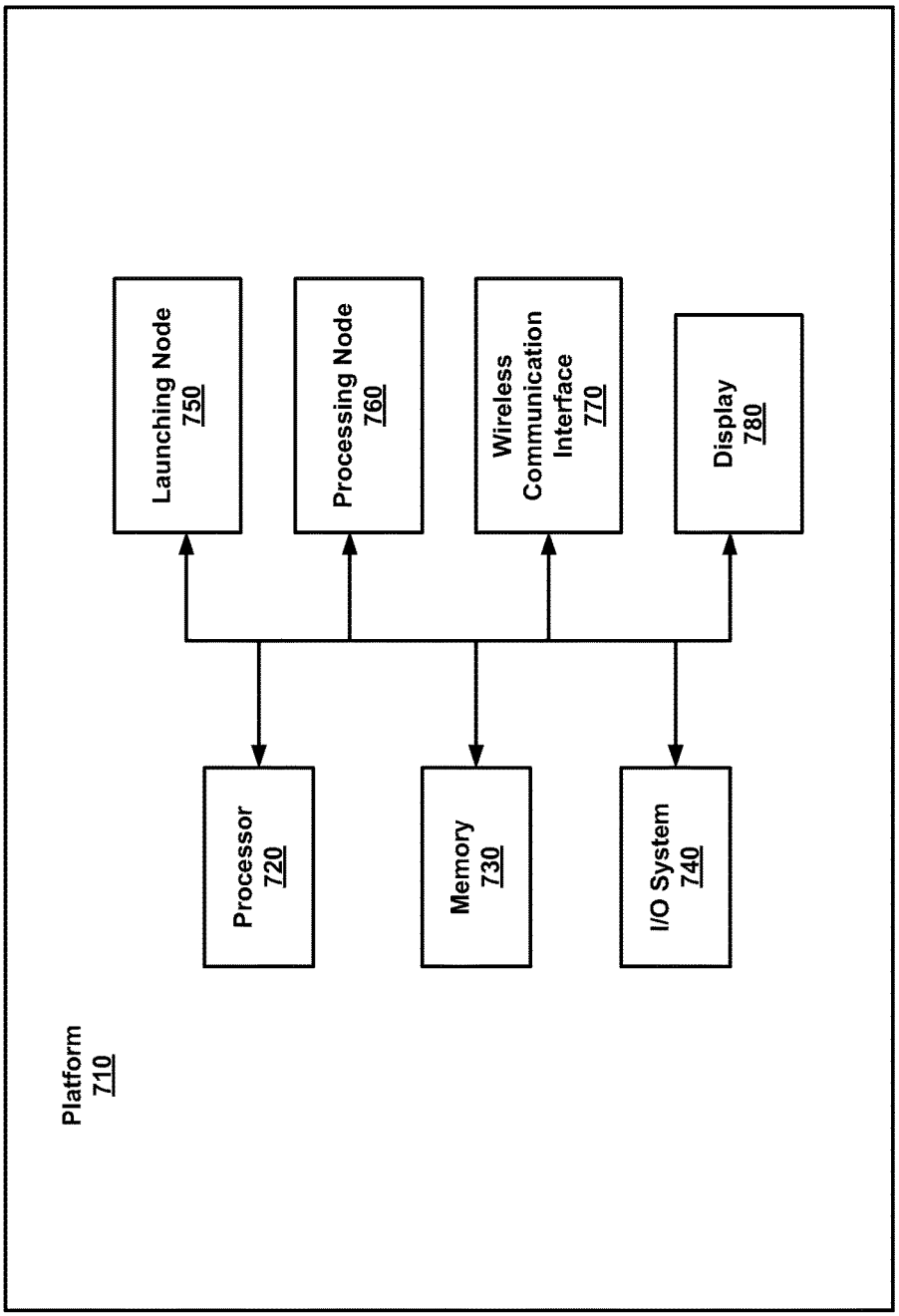
FIG. 7 illustrates a top level system diagram of a platform of another example embodiment consistent with the present disclosure.

FIG. 7 illustrates a top level system diagram 700 of one example embodiment consistent with the present disclosure. The system 700 may be a hardware platform 710 or computing device such as, for example, a smart phone, smart tablet, personal digital assistant (PDA), mobile Internet device (MID), convertible tablet, notebook or laptop computer, desktop computer, server, smart television or any other device whether fixed or mobile. The device may generally present various interfaces to a user via a display 780 such as, for example, a touch screen, liquid crystal display (LCD) or any other suitable display type.

The system 700 is shown to include a processor 720. In some embodiments, processor 720 may be implemented as any number of processor cores. The processor (or processor cores) may be any type of processor, such as, for example, a micro-processor, an embedded processor, a digital signal processor (DSP), a network processor, a field programmable gate array or other device configured to execute code. Processor 720 may be a single-threaded core or, a multi-threaded core in that it may include more than one hardware thread context (or "logical processor") per core. System 700 is also shown to include a memory 730 coupled to the processor 720. The memory 730 may be any of a wide variety of memories (including various layers of memory hierarchy and/or memory caches) as are known or otherwise available to those of skill in the art. System 700 is also shown to include an input/output (IO) system or controller 740 which may be configured to enable or manage data communication between processor 720 and other elements of system 700 or other elements (not shown) external to system 700. System 700 may also include a wireless communication interface 770 configured to enable wireless communication between system 700 and any external entities. The wireless communications may conform to or otherwise be compatible with any existing or yet to be developed communication standards including mobile phone communication standards.

The system 700 may further include a launching node 750 and one or more processing nodes 760. The launching node may be configured to launch MPI-based processes or applications on processing nodes 760, as described previously. In some embodiments, the launching node 750 may be one of the processing nodes 760. In some embodiments, the launching node 750 and/or processing nodes 760 may be embodied in processor 720. In some embodiments, the launching node 750 and processing nodes 760 may be distributed over multiple instances of platform 710 and may be configured as a cluster of parallel processing nodes.

It will be appreciated that in some embodiments, the various components of the system 700 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry," as used in any embodiment herein, may include, for example, singly or in any combination, hard-wired circuitry, programmable circuitry, state machine circuitry, and/or firmware that stores instructions executed by programmable circuitry. The circuitry may be embodied as an integrated circuit, such as an integrated circuit chip. Software and/or applications (apps) may be embodied as code or instructions which may be executed on programmable circuitry such as a host processor or other programmable circuitry. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. A "module," as used in any embodiment herein, may be embodied as any combination of software, firmware and/or circuitry.

Thus, the present disclosure provides systems, devices, methods and computer readable media for launching MPI-based processes and applications in a heterogeneous environment. The following examples pertain to further embodiments.

According to example 1 there is provided a processing node for launching MPI-based processes. The processing node may include an operating system (OS), the OS to receive a request for Message-Passing-Interface (MPI)-based processing, the request received from a process manager module on a launching node. The processing node of this example may also include a proxy module to launch an MPI-based process in response to receiving the request. The MPI-based process of this example may further include an application module to communicate with other MPI-based processes in accordance with an MPI standard, the communication associated with performance of a task.

Example 2 may include the elements of example 1, and the proxy module is created through execution of a secure shell (SSH).

Example 3 may include the elements of example 2, and the MPI-based process is launched with privileges associated with the process manager module on the launching node.

Example 4 may include the elements of example 2, and the OS is a Linux® OS or a MacOS®.

Example 5 may include the elements of example 1, and the proxy module is created through a system service module of the OS.

Example 6 may include the elements of example 5, and the system service module executes with administrative privileges and the MPI-based process is launched with privileges associated with the process manager module on the launching node.

Example 7 may include the elements of example 5, and the OS is a Windows® OS.

Example 8 may include the elements of example 1, and the processing node is one of a plurality of processing nodes organized as a parallel processing cluster of nodes, and the launching node is one of the processing nodes.

Example 9 may include the elements of example 1, and the request for MPI-based processing is received over a Transmission Control Protocol (TCP) socket.

Example 10 may include the elements of example 1, and the proxy module is further to launch a second proxy module on a second processing node, the second proxy module to launch the MPI-based process on the second processing node.

According to example 11 there is provided a system for launching MPI-based processes on multiple platform types. The system may include a first OS, associated with a launching node platform, the first OS to provide communication between the launching node platform and a processing node platform, and the multiple platform types include the launching node platform and the processing node platform. The system of this example may also include a process manager (PM) module, associated with the launching node platform. The PM module of this example may include an OS type determination module to determine a type of a second OS associated with the processing node platform. The PM module of this example may also include a launch request module to send a request to the processing node platform, the request to create a proxy module to launch an MPI-based process on the processing node platform, and communication of the request is based on the determined type of the second OS.

Example 12 may include the elements of example 11, and the proxy module is created through execution of a secure shell (SSH).

Example 13 may include the elements of example 11, and the second OS is a Linux® OS or a MacOS®.

Example 14 may include the elements of example 11, and the proxy module is created through a system service module of the second OS.

Example 15 may include the elements of example 11, and the second OS is a Windows® OS.

Example 16 may include the elements of example 11, and the processing node platform is one of a plurality of processing node platforms organized as a parallel processing cluster of nodes, and the launching node platform is one of the processing node platforms.

Example 17 may include the elements of example 11, and the first OS is a Linux® OS, a MacOS® or a Windows® OS.

Example 18 may include the elements of example 11, and the launching node platform and/or the processing node platform are a smart phone, a laptop computing device, a smart TV or a smart tablet.

Example 19 may include the elements of example 11, and the launching node platform and the processing node platform further include a user interface, and the user interface is a touch screen.

According to example 20 there is provided a method for launching an MPI-based process from a launching node. The method of this example may include determining an OS type associated with a processing node on which the MPI-based process is to be launched. The method of this example may also include launching a proxy module on the processing node, the proxy module to launch the MPI-based process, and the launching of the proxy module includes operations based on the determined processing node OS type.

Example 21 may include the elements of example 20, and the launching of the proxy module further includes executing a secure shell for remote process launching.

Example 22 may include the elements of example 21, and the OS is a Linux® OS or a MacOS®.

Example 23 may include the elements of example 20, and the launching of the proxy module further includes requesting a remote process launching from a system service module executing on the processing node.

Example 24 may include the elements of example 23, and the OS is a Windows® OS.

Example 25 may include the elements of example 20, and the proxy module on the processing node is further to perform launching of a second proxy module on a second processing node, the second proxy module to launch the MPI-based process on the second processing node.

According to example 26 there is provided a system for launching an MPI-based process from a launching node. The system of this example may include a means for determining an OS type associated with a processing node on which the MPI-based process is to be launched. The system of this example may also include a means for launching a proxy module on the processing node, the proxy module to launch the MPI-based process, and the launching of the proxy module includes operations based on the determined processing node OS type.

Example 27 may include the elements of example 26, and the launching of the proxy module further includes means for executing a secure shell for remote process launching.

Example 28 may include the elements of example 27, and the OS is a Linux® OS or a MacOS®.

Example 29 may include the elements of example 26, and the launching of the proxy module further includes means for requesting a remote process launching from a system service module executing on the processing node.

Example 30 may include the elements of example 29, and the OS is a Windows® OS.

Example 31 may include the elements of example 26, and the processing node is one of a plurality of processing nodes organized as a parallel processing cluster of nodes, and the launching node is one of the processing nodes.

Example 32 may include the elements of example 26, and communication between the launching node and the processing node is performed over TCP sockets.

Example 33 may include the elements of example 26, and the proxy module on the processing node further includes means for launching of a second proxy module on a second processing node, the second proxy module to launch the MPI-based process on the second processing node.

According to another example there is provided at least one computer-readable storage medium having instructions stored thereon which when executed by a processor, cause the processor to perform the operations of the method as described in any of the examples above.

According to another example there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for launching Message-Passing-Interface (MPI)-based processes, said system comprising:
   a first operating system (OS) associated with a launching node platform, the first OS to provide communication between the launching node platform, a first processing node, and a second processing node; and
   process manager (PM) circuitry associated with the launching node platform, said PM circuitry to:
      determine a type of OS associated with the first processing node and the second processing node;
      cause the first processing node to generate, based at least in part on a first determined type of OS associated with the first processing node, a first proxy in a first respective manner;
      cause the second processing node to generate, based at least in part on a distinct second determined type of OS associated with the second processing node, a second proxy in a distinct second respective manner;
   wherein the first proxy launches at least one first MPI-based process to communicate with at least one second MPI-based process launched by the second proxy; and
   wherein the first OS associated with the launching node platform and the first determined type of OS associated with the first processing node are the same type of OS.

2. The system of claim 1, wherein to cause the first processing node to generate a first proxy in a first respective manner comprises execution of a secure shell (SSH).

3. The system of claim 1, wherein to cause the first processing node to generate a first proxy in a first respective manner comprises requesting a remote process launch from system service circuitry on said first processing node.

4. The system of claim 1, wherein the first processing node and second processing node are organized as a parallel processing cluster of nodes.

5. The system of claim 1, wherein the launching node platform, the first processing node platform, and the second processing node platform are selected from one or more of a group consisting of a smart phone, a laptop computing device, a smart TV and a smart tablet.

6. A method for launching Message-Passing-Interface (MPI)-based processes, said method comprising:
   determining, by cross-platform process manager (PM) circuitry of a launching node, a type of operating system (OS) associated with a first processing node and a second processing node communicatively coupled to the launching node;
   causing the first processing node to generate, by the cross-platform PM and based at least in part on a first determined type of OS associated with the first processing node, a first proxy in a first respective manner;
   causing the second processing node to generate, by the cross-platform PM and based at least in part on a distinct second determined type of OS associated with the second processing node, a second proxy in a distinct second respective manner;

wherein the first proxy launches at least one first MPI-based process to communicate with at least one second MPI-based process launched by the second proxy; and wherein the first OS associated with the launching node platform and the first determined type of OS associated with the first processing node are the same type of OS.

7. The method of claim 6, wherein causing the first processing node to generate a first proxy in a first respective manner comprises executing a secure shell (SSH) for remote process launching.

8. The method of claim 6, wherein causing the first processing node to generate a first proxy in a first respective manner comprises requesting a remote process launch from system service circuitry operating on said first processing node.

9. The method of claim 6, wherein causing the first processing node to generate a first proxy in a first respective manner is performed via proxy circuitry on the first processing node.

10. At least one non-transitory computer-readable storage medium having instructions stored thereon which when executed by a processor result in the following operations for launching Message-Passing-Interface (MPI)-based processes, said operations comprising:

determining, by a cross-platform process manager (PM) executing via a first operating system (OS) of a launching node, an OS type associated with a first processing node and a second processing node;

causing the first processing node to generate, by the cross-platform PM and based at least in part on the determining of the type of OS associated with the first processing node, a first proxy in a first respective manner; and causing the second processing node to generate, by the cross-platform PM and based at least in part on a distinct second determined type of OS associated with the second processing node, a second proxy in a distinct second respective manner;

wherein the first proxy launches at least one first MPI-based process to communicate with at least one second MPI-based process launched by the second proxy; and wherein the first OS associated with the launching node platform and the first determined type of OS associated with the first processing node are the same type of OS.

11. The computer-readable storage medium of claim 10, wherein causing the first processing node to generate a first proxy in a first respective manner comprises the operation of executing a secure shell (SSH) for remote process launching.

12. The computer-readable storage medium of claim 10, wherein causing the first processing node to generate a first proxy in a first respective manner comprises the operation of requesting a remote process launch from system service circuitry operating on said processing node.

13. The computer-readable storage medium of claim 10, wherein communication between said launching node, the first processing node and the second processing node is performed over TCP sockets.

* * * * *